Figure 1:
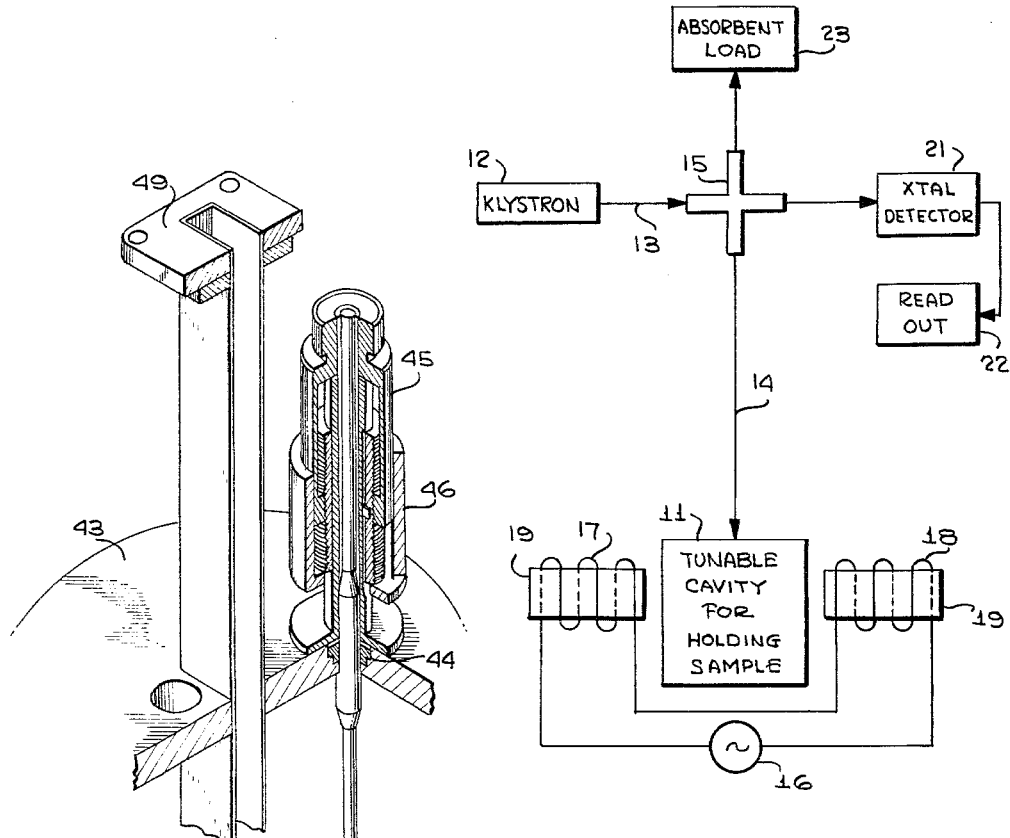

March 22, 1966   M. R. KAGAN   3,242,427
TUNABLE MICROWAVE CAVITY
Filed Sept. 11, 1962

INVENTOR.
MORTON R. KAGAN
BY Hurvitz & Rose

ATTORNEYS 3,242,427
TUNABLE MICROWAVE CAVITY
Morton R. Kagan, Silver Spring, Md., assignor to Melpar, Inc., Falls Church, Va., a corporation of Delaware
Filed Sept. 11, 1962, Ser. No. 222,919
4 Claims. (Cl. 324—58)

The present invention relates generally to tunable microwave cavities and more particularly to a cavity that is adapted for use in testing paramagnetic resonant properties wherein the sample being tested is rotated with the floor of the cavity during tuning to effect orientation changes between the sample and a steady magnetic field.

In testing crystal materials for paramagnetic resonance, it is often necessary to change the relative orientation of the sample tested with respect to a steady low frequency or D.C. magnetic field. This is because the D.C. magnetic field combines with an orthogonal component of a R.F. field to excite the electrons from one energy level to another and produce the paramagnetic oscillations. By varying the relative orientation of the sample to the low frequency field, the amount of energy applied to the electrons in the various transition levels is changed in response to the vector cross product of the low and high frequency fields.

In the past, it has been the practice to rotate the magnetic field assembly while maintaining the crystal in an invariant location. This resulted in a large, costly, unwieldy structure that does not permit facile placement of the crystal.

I have found that exceptional results in testing paramagnetic properties are attained by utilizing a tunable microwave cavity having a floor that is capable of being both translated and rotated. Upon the floor is placed the sample being tested which is rotated as the cavity is tuned to change the relative orientation of the sample to the low frequency magnetic field. Rotation and translation of the cavity floor is effected by means of a gear train coupled between a plunger up which the floor is mounted and a vernier drive mechanism. Because paramagnetic studies are generally made in an environment of extremely low temperatures, e.g. liquid helium or nitrogen, which must be conducted in a Dewar flask, an elongated coupling between the gear train and the vernier drive is provided. This enables the sample position to be changed at will without the necessity for interrupting the experiment.

To insert the sample into the chamber, one of its end plates is removable. The plunger carrying the table upon which the sample is placed includes a longitudinal port through which a probe carrying the sample may fit.

To vary the degree of energy coupled to the cavity in accordance with the nature of the sample or the temperature at which the experiment is being conducted, an iris diaphragm is situated so that it may easily be removed. Thereby, different sized irises may be utilized as the conditions warrant to enable paramagnetic studies to be conducted at temperatures between −273° C. and 950° C.

To provide accurate indications of the frequencies at which paramagnetic resonance occurs, it is important that the cavity have a high Q factor. The cavity is excited to a $TE_{011}$ mode which makes it possible to achieve unloaded Q's in excess of 50,000 and the necessary degree of resolution.

It is accordingly an object of the present invention to provide a new and improved microwave resonant cavity which is particularly adapted for use in paramagnetic resonant studies.

Another object of the present invention is to provide a new and improved variable frequency microwave cavity which has extremely high Q's, even when loaded by a paramagnetic sample.

It is another object of the present invention to provide a resonant cavity capable of wide resonant frequency variations even when it is positioned in a Dewar flask containing liquid helium or nitrogen.

A further object of the present invention is to provide a resonant cavity in which critical coupling is attained for widely varying samples.

An additional object of the present invention is to provide critical coupling between a resonant cavity and the transmission line coupled thereto for temperature ranges between −273° C. and +950° C.

Still another object of the present invention is to provide a resonant cavity in which the coupling iris diaphragm is easily removed.

Figure 2:
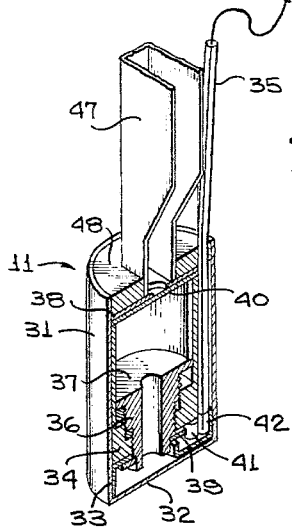

The above and still further objects, features and advantages of the present invention will become apparent upon consideration of the following detailed description of one specific embodiment thereof, especially when taken in conjunction with the accompanying drawings, wherein:

FIGURE 1 is a block diagram of a paramagnetic resonant testing system in which the present invention is employed; and FIGURE 2 is a perspective view, in section, of a preferred embodiment of the present invention.

Reference is now made to FIGURE 1 of the drawings, a block diagram of the system utilized for testing the paramagnetic properties of a solid material, e.g. a crystal, where the reference numeral 11 denotes a tunable, cylindrical, resonant cavity in which the tested sample is placed. Cavity 11, which includes a rotatable table for holding the sample, is excited to the $TE_{011}$ mode by tunable klystron 12 having a resonant frequency set to that of the cavity. Energy from klystron 12 is coupled to the aperture of cavity 11 in the $TE_{01}$ mode via wave guides 13 and 14 as well as magic T coupler 15. To conduct a paramagnetic study, cavity 11 is generally positioned in a Dewar flask maintained at a temperature at which helium or nitrogen is in a liquid state.

To establish a low frequency magnetic field in cavity 11 in a direction parallel to the E field established therein by klystron 12, audio frequency source 16, e.g. of 100 c.p.s., is connected to coils 17 and 18 which are wound on magnetic cores 19. The magnetic field established by source 16 appears to the electrons in the sample as a steady or D.C. field compared to the R.F. excitation from source 12. This results in modulation of the energy reflected from cavity 11 to permit ease of detection by crystal detector 21 which is connected to another arm of magic T 15. The output crystal detector 21 is coupled to a paper tape read out display 22 which provides information indicative of the energy reflected from cavity 11, hence of the paramagnetic properties of the tested sample. Connected to the other arm of magic T 15 is absorbent load 23 which is a matched impedance to prevent reflections back into the magic T of the energy coupled thereto from cavity 11 and source 12.

In use, minimum reflection from cavity 11 occurs when it and klystron 12 are turned to a frequency equal to a paramagnetic resonance of the sample being tested, as governed by the equation $$h\nu = g_e \frac{eh}{4\pi m} H$$

where, $h$ = Plank's constant,
$\nu$ = the frequency of paramagnetic resonance,
$g_e$ = a constant for the material being tested, termed the spectroscopic splitting factor,
$e$ = the charge of an electron ($1.6 \times 10^{-19}$ coulomb)
$m$ = the mass of an electron ($9 \times 10^{-31}$ kg.), and
$H$ = the instantaneous amplitude of the low frequency magnetic field in a direction orthogonal to the high frequency magnetic field acting on a particular electron.

For different orientations of the sample relative to the low frequency field, different paramagnetic resonant frequencies are derived. This is because transitions between electrons in the various electron levels are a function of the vector cross product between the low and high frequency fields to which a particular electron are subjected. As the direction of the low frequency field relative to the high frequency field is varied, the paramagnetic resonant frequency of the sample is thereby changed. According to the present invention, this change in orientation is achieved by placing the sample on a table which is rotated and translated within cavity 11. Thereby, the resonant frequency of the cavity and the position of the sample relative to the low frequency magnetic field are simultaneously adjusted.

Reference is now made to FIGURE 2 of the drawings, a perspective view, in section, of a preferred embodiment of cavity 11 and the coupling apparatus therefor. Cavity 11 includes an external cylindrical shell 31 having a removable circular end plate 32. A flange 33 on plate 32 extends longitudinally of shell 31 against its interior wall and abuts against the lower edge of sleeve 34. The entire exterior wall of sleeve 34 contacts the interior of shell 31. On side of sleeve 34, the exterior wall is enlarged and provided with a cylindrical bore through which stainless steel tuning rod 35 extends. At the bottom of sleeve 34, a threaded seat is provided which engages rotatable and translatable plunger 36. A table 37, effectively the floor of cavity 11, is located at the upper end of plunger 36 upon which the sample to be tested is placed. To permit ingress and egress of the sample to table 37 via the aperture created when plate 32 is removed, a port extending longitudinally to the axis of shell 31 is provided in the center of plunger 36.

To control the longitudinal and rotational position of pedestal 36, hence of the sample placed thereon, a gear train, comprising ring gear 39, secured to piston 36, and cylindrical gears 41 and 42, is connected to tuning rod 35. Gear 42 is fixedly mounted on the end of rod 35 so that rotation of the latter is coupled to the former and to piston 36. Rod 35, which is of considerable length due to the location of cavity 11 in a Dewar flask frequently maintained at an internal temperature less than the boiling point of helium, extends into a vernier drive mechaism located on the cover plate 43 for the Dewar. To insure the establishment of a vacuum in the Dewar, seal 44 is provided in the aperture of plate 43 through which an enlarged mating segment of rod 35 fits. Rod 35 is fixedly secured to the walls of a bore in vernier drive knob 45 which includes a mark that moves relative to the scale on sleeve 46 to provide an indication of the frequency to which the cavity is tuned, hence of the sample orientation relative to the low frequency magnetic field.

To couple microwave energy to the sample located on pedestal 37, a replaceable iris diaphragm 38 is positioned against the upper edge of sleeve 33. Diaphragm 38, like each of the other elements in cavity 11, is fabricated from brass and has a silver coating to promote establishment of the desired high frequency field. The silver plating is utilized to reduce the loss due to the current produced by the microwave field. A current density $\vec{J} = \vec{n} \times \vec{H}_{\mathrm{rf}}$ is induced from the R.F. magnetic field $\vec{H}_{\mathrm{rf}}$, where $\vec{n}$ is a unit vector normal to the wall in question. The loss is, therefore, $J^2R$, where R is the resistivity of the cavity walls. Since R for silver is less than that for brass, the resultant loss would be less for the plated cavity than for a cavity. In the iris of diaphragm 38, a chamfered brass plate 40 is positioned to enable the X-band energy in rectangular wave guide 47 to be fed into cavity 11. Because of the $TE_{011}$ field configuration in cavity 11, different iris diaphragms having apertures of varying size may be utilized without electromagnetic losses at the diaphragm contact location when it is desired to vary the degree of energy coupling between cavity 11 and guide 47. Coupling requirements change in accordance with the nature of the sample being tested and the temperature range in which the investigation is made.

At the contact location between diaphragm 38 and rectangular guide 47, a special brass flange 48 having an off-center bore through which rod 35 fits is secured to the end of wave guide 47. Flange 48 is wedged into position against shell 31 to enable the shell to be removed from it, thus enabling diaphragm 38 to be easily replaced.

To establish the energy path between magic T 15, which is located exteriorly of the Dewar flask in which cavity 11 is located, and the wave guide flange 49, wave guide 47 extends through a slot in cover plate 43. Port 51 is provided in plate 43 for feeding liquid helium into the Dewar to attain the desired temperature for the test being performed.

With the cavity of the present invention, it is possible to attain a 360° rotation of the sample within cavity 11 relative to the low frequency field orientation established in a direction normal to the axis of shell 31 by a one quarter inch translation of vernier knob 45. This results in a 0.037 kmc. variation in the natural resonant frequency of cavity 11 which must be compensated by a frequency adjustment of klystron 12. I have found that each 0.001 inch translation of pedestal 37 causes a 1.44° sample rotation and a linear 150 kc. resonant frequency variation of chamber 11.

Also I have found that the present chamber exhibits extremely high Q factors over the entire frequency spectrum of interest. Unloaded Q factors in excess of 50,000 have been attained to enable great frequency resolution, hence highly accurate information anent the paramagnetic resonant frequencies of the sample.

While I have described and illustrated one specific embodiment of my invention, it will be clear that variations of the details of construction which are specifically illustrated and described may be resorted to without departing from the true spirit and scope of the invention as defined in the appended claims.

I claim:

1. A system for testing paramagnetic resonance of a sample, comprising a cylindrical resonant cavity adapted to hold said sample, said cavity having a longitudinal axis and a floor orthogonal to said axis, said floor being adapted to hold said sample, means for coupling microwave energy to said cavity to excite said cavity to a $TE_{01n}$ mode, means for coupling a steady magnetic field to said cavity orthogonally to said axis and parallel to the microwave energy electric field, and means for rotating said floor while said steady magnetic field remains constantly oriented and while said floor is being translated along said axis.

2. The system of claim 1 wherein said means for coupling includes a replaceable iris diaphragm for coupling the microwave energy into the cavity.

3. A system for testing paramagnetic resonance of a sample comprising a tunable microwave energy source, a cylindrical resonant cavity in which said sample is adapted to be placed, said cavity having a longitudinal axis and a floor orthogonal to said axis, said floor being adapted to hold said sample, means for coupling energy from said source to said cavity to excite said cavity to the $TE_{011}$ mode, means for coupling a steady magnetic field to said cavity orthogonally to said axis and parallel to the electric field of the microwave energy exciting said cavity, means for rotating said floor relative to said magnetic field while maintaining the orientation of said magnetic field invariant and while translating said floor along said axis, and means coupled to said cavity for detecting the energy reflected from it.

4. A method for testing paramagnetic resonance of a sample in a cylindrical resonant cavity having a longitudinal axis and a floor orthogonal to said axis, comprising the steps of placing said sample on the floor of said cavity, coupling microwave energy of a first predetermined frequency to excite said cavity to the $TE_{011}$ mode, coupling a steady magnetic field to said cavity orthogonally to the axis of said cavity and parallel to the electric field excited in said cavity by the microwave energy, detecting the microwave energy reflected from said cavity at said first predetermined frequency, rotating and translating the floor of said cavity so that said sample and steady magnetic field are at a different orientation, adjusting the frequency of the microwave energy to a second frequency so that said cavity is again excited to the $TE_{011}$ mode, and detecting the microwave energy reflected from said cavity at said second frequency.

References Cited by the Examiner
UNITED STATES PATENTS 3,090,033    5/1963    Rempel et al. _____ 324—58.5 X

OTHER REFERENCES

"A Double Magnetic Field Modulation Paramagnetic Resonance Spectrometer," article in the Canadian Journal of Physics, vol. 34, 1956, pages 711–721.

"EPP Spectrometer of Very High Sensitivity," article in The Review of Scientific Instruments (II), July 1958, pages 590–594.

"Laboratory and Workshop Notes," article in Journal of Scientific Instruments, December 1955, pages 484, 485.

Physical Review, vol. 174, page 1211, paragraphs D7 and D8.

"Recording High-Sensitivity Paramagnetic-Spectrometer," article in The Review of Scientific Instruments (I); January 1955, pages 34–40.

"Relaxation Effects in Ferromagnetic Resonance," article in Reviews of Modern Physics, January 1953, pages 239–245.

WALTER L. CARLSON, *Primary Examiner.*

A. E. RICHMOND, *Assistant Examiner.*